United States Patent [19]
Kirschner

[11] Patent Number: 5,886,765
[45] Date of Patent: Mar. 23, 1999

[54] FRAME WITH DECORATION ROTATABLY MOUNTED ON IT

[76] Inventor: Mitchell Kirschner, 7235 Creveling Dr., St. Louis, Mo. 63130

[21] Appl. No.: 755,703

[22] Filed: Nov. 25, 1996

[51] Int. Cl.[6] .................................................. G02C 11/02
[52] U.S. Cl. .............................................. 351/52; 351/51
[58] Field of Search ................................. 351/51, 52, 41, 351/158

[56] References Cited

U.S. PATENT DOCUMENTS

| | | | |
|---|---|---|---|
| 4,848,889 | 7/1989 | Shaw | 351/51 |
| 5,469,230 | 11/1995 | Murai et al. | 351/52 |

Primary Examiner—Hung Xuan Dang
Attorney, Agent, or Firm—Polster, Lieder, Woodruff & Lucchesi LC

[57] ABSTRACT

In a device with a central transparent member and a frame around the member, fixed elements hold the transparent member stationary with respect to the frame. A decorative element is mounted for rotation with respect to the fixed elements from a position in which one decorative aspect of the decorative element is displayed to a position in which another decorative aspect of the decorative element is displayed. In at least one embodiment, a multiplicity of decorative element is employed. In other embodiments, the central transparent member carries aligned, outwardly extending shafts on which the decorative element is mounted for rotation.

16 Claims, 3 Drawing Sheets

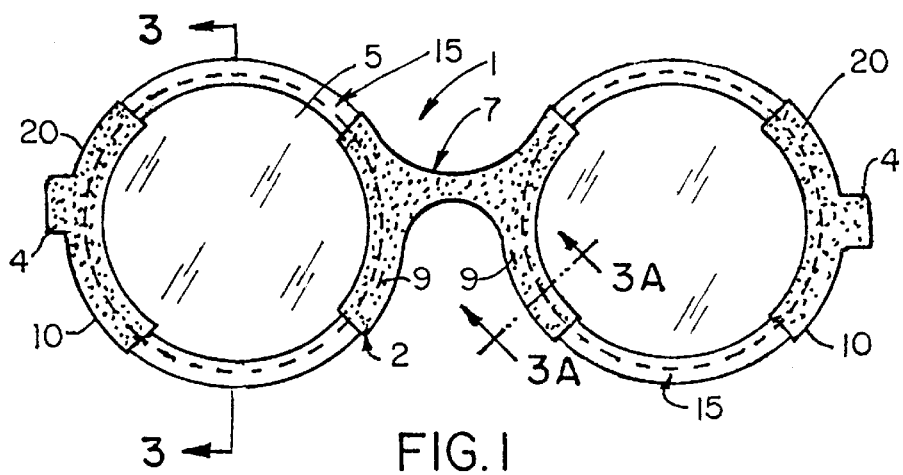
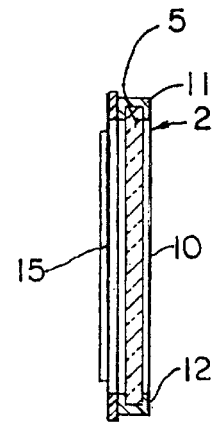
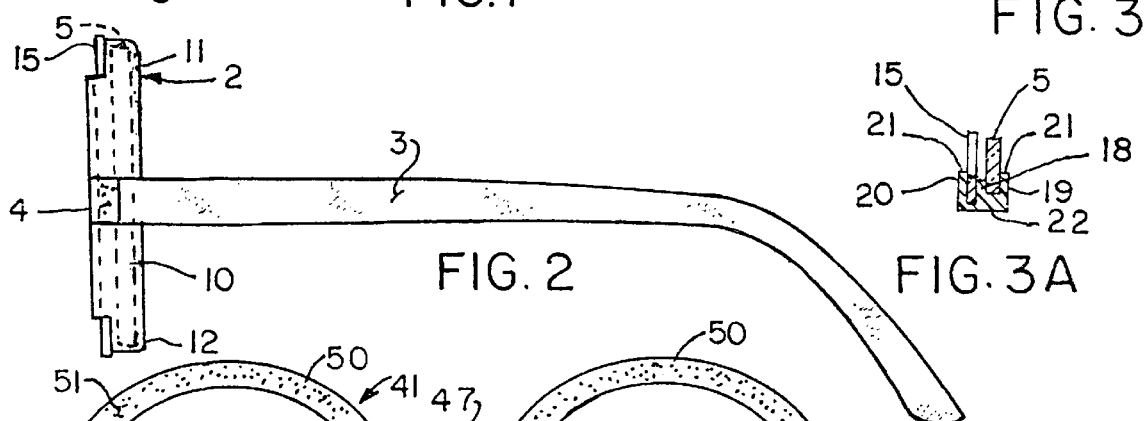
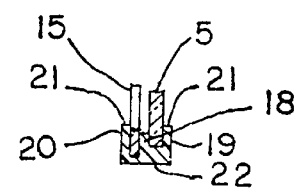
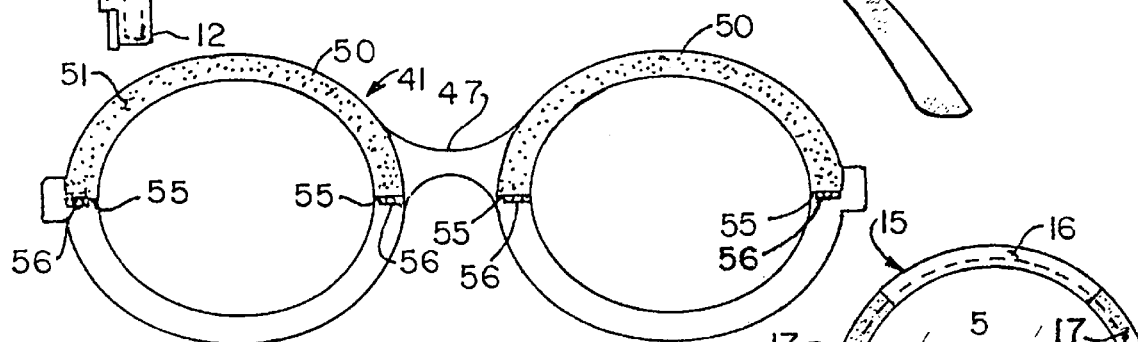
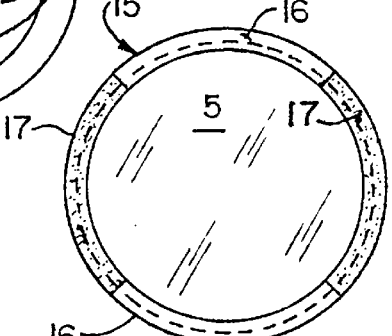
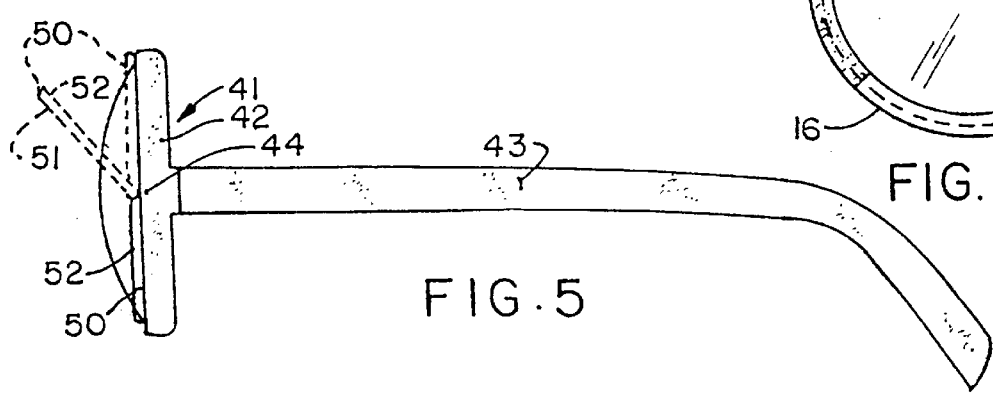

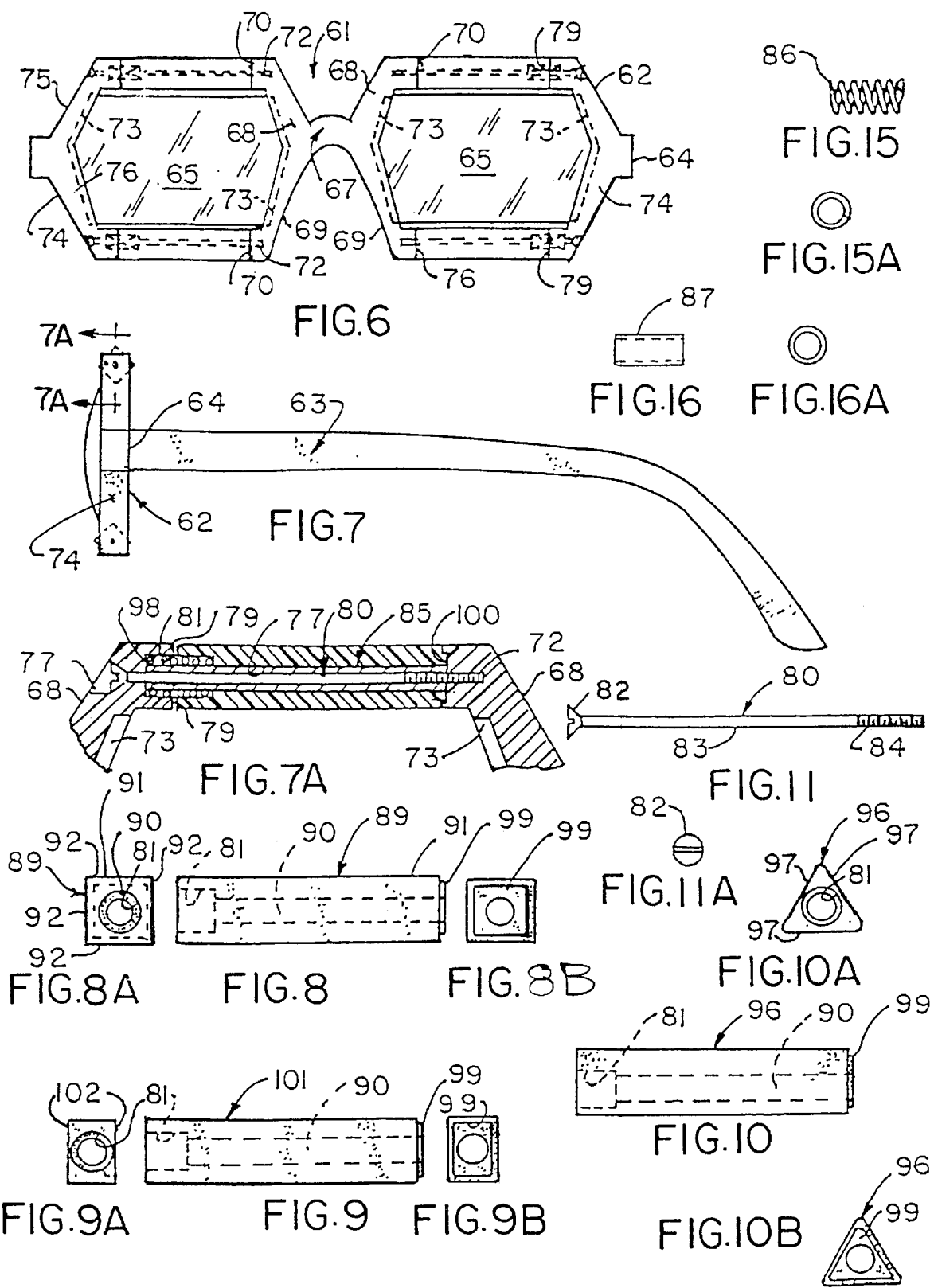

5,886,765

FRAME WITH DECORATION ROTATABLY MOUNTED ON IT

CROSS-REFERENCE TO RELATED APPLICATIONS

This application is related to applicant's U.S. application Ser. No. 08/651,271 filed May 23, 1996, the description of some of the elements of which may be helpful, and a combination of the present invention with which is contemplated.

STATEMENT REGARDING FEDERALLY SPONSORED RESEARCH OR DEVELOPMENT

Not Applicable.

BACKGROUND OF THE INVENTION

In applicant's application Ser. No. 08/651,271, eye glasses are described and claimed in which temple pieces are provided with fittings for varying the design displayed to the observer. In the present application, a provision is made for varying the appearance of the lens frame. A device for changing the appearance of lens frames has been described heretofore in a patent to Shaw, U.S. Pat. No. 4,848,889, in which the frame, made from transparent plastic material, has an elongated passage within which an elongated flexible colored member having sides of different colors is located. In order to change the appearance of the frame, the elongated member has to be withdrawn from the passage and threaded back through the passage in a different orientation.

The invention is described herein as applied to eyeglass frames. The same teaching can be applied to other articles in which a transparent or silvered transparent member is held fixedly in a frame. As to eyeglasses themselves, the term is used to embrace sunglasses, safety glasses, ordinary corrective lens glasses, goggles and the like.

One of the objects of this invention is to provide means for varying the appearance of the frame or frames surrounding a transparent member such as a lens in a simple, readily accomplished way.

Other objects will become apparent to those skilled in the art in the light of the following description and the accompanying drawing.

BRIEF SUMMARY OF THE INVENTION

In accordance with this invention, generally stated, in eyeglasses having a lens-carrying frame, frame members are adapted to hold a lens fixedly against movement with respect to the frame. Decorative segments are mounted for rotation with respect to the frame members from a position at which one decorative aspect of the decorative element is displayed, to a position at which another decorative aspect of the decorative element is displayed, without removing the decorative element from the frame. In frameless devices such as so-called granny glasses, a decorative element can be mounted on pins or shafts secured to and projecting alignedly from the central element (lens or the like) for rotation from a position at which one decorative element aspect of the decorative element is displayed to a position at which another decorative aspect of the decorative element is displayed, again, without removing the decorative element.

In one embodiment described hereinafter, the lens-holding frame is circular in elevation, the fixed members include channel members connected by an arcuate bridging strip, and the decorative element is a thin ring, mounted in the channel members for rotation with respect to the lens. The decorative element has segments of a size to be received by the fixed channels, which may be of any material such as wood, metal or polymer which may be opaque or translucent or transparent but colored, and to be displayed outside the channels when the decorative element is rotated. In another embodiment, the lens-holding frame is conventional in the sense of being continuous around the lens, being symmetrical about a center line of the lens holding frame, and the decorative element, which is shaped complementarily to the halves of the frame or lens is hinged at two free ends, so as to be rotatable about hinges mounted on the frame or lens, to a position at which one side of the decorative element is displayed, and to a position 180° from the first position, at which another side of the decorative element is displayed. In a third embodiment, the lens-holding frame has a nose engaging bridge part and a temple part, spaced from one another, and connected by shafts on which decorative segments are mounted for rotation. In still another embodiment, a frame surrounding a lens is pivoted to rotate about pins that are attached to edges of the lens.

BRIEF DESCRIPTION OF THE SEVERAL VIEWS OF THE DRAWINGS

In the drawings, FIG. 1 is a view in front elevation of eyeglasses made in accordance with one embodiment of this invention;

FIG. 2 is a view in side elevation of the eyeglasses shown in FIG. 1;

FIG. 2A is a view in front elevation of a decorative element of the eyeglasses shown in FIGS. 1 and 2;

FIG. 3 is a sectional view taken along the line 3—3 of FIG. 1;

FIG. 3A is a sectional view taken along the line 3A—3A of FIG. 1;

FIG. 4 is a view in front elevation of a second embodiment of eyeglasses of this invention;

FIG. 5 is a view in side elevation of the eyeglasses as shown in FIG. 4;

FIG. 6 is a view in front elevation of a third embodiment of the eyeglasses of this invention;

FIG. 7 and 7A are a view in side elevation of the device shown in FIG. 6;

FIG. 8 is a view in side elevation of a decorative element of the embodiment shown in FIGS. 6 and 7;

FIG. 8A is a view in end elevation of the decorative element of FIG. 8, viewed from left to right FIG. 8B is a view in end elevation of the decorative element of FIG. 8, viewed from right to left FIG. 9 is a view in side elevation of another embodiment of decorative element for use in eyeglasses of the type shown in FIG. 6;

FIG. 9A is a view in end elevation of the decorative element of FIG. 9, viewed from left to right;

FIG. 9B is a view in end elevation of the decorative element of FIG. 9, viewed from right to left;

FIG. 10 is a view in side elevation of a third embodiment of decorative element of the eyeglasses shown in FIG. 6;

FIG. 10A is a view in end elevation of the decorative element of FIG. 10, viewed from left to right;

FIG. 10B is a view in end elevation of the decorative element of FIG. 10, viewed from right to left;

FIG. 11 is a view in side elevation of a shaft element of the eyeglasses shown in FIGS. 6–8;

FIG. 11A is a view in end elevation of the shaft shown in FIG. 11, viewed from left to right;

FIG. 15 is a view in side elevation of a spring element of the eyeglasses shown in FIGS. 6–8;

FIG. 15A is a view in end elevation of the spring element of FIG. 15;

FIG. 16 is a view in side elevation of a resilient member which can be used in lieu of the spring of FIG. 15; and FIG. 16A is a view in end elevation of the member shown in FIG. 16.

DETAILED DESCRIPTION OF THE INVENTION

Figure 12:
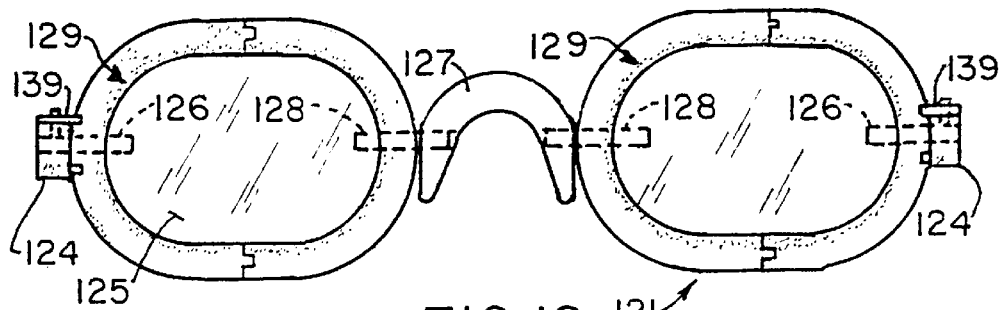
FIG. 12 is a view in front elevation of yet another embodiment of eyeglasses of this invention.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

Referring now to FIGS. 1 though 3A for one illustrative embodiment, reference numeral 1 indicates a pair of eyeglasses, hereinafter referred to as an eyeglass, of this invention, which has a lens frame 2, temple pieces 3, and hinges 4, of which bosses integral with the frame are a part. The hinge 4 can be a conventional eyeglass hinge. It is mounted on an arcuate, open ended, outer channel member 10. An inner, open ended, channel member 9 is integral with a nose piece or bridge 7. In this embodiment, the outer channel member 10 and the inner channel member 9 are connected integrally by means of an upper connecting rail 11 and a lower connecting rail 12. The arcuate channel members 9 and 10 have back walls 19, front walls 20, top edges 21 bottom walls 22, and intermediate walls 18, as shown particularly in FIG. 3A. The back wall 19 and intermediate wall define between them a lens-receiving channel. The intermediate wall 18 and front wall 20 define between them a design element channel.

A circular design element or carrier 15 is rotatably mounted in the channel members 9 and 10, as shown in FIGS. 1, 2, and 3 and 3A. The front walls 20 of the arcuate channel members 9 and 10 are shown in this embodiment as opaque. The design carrier 15 is self-supporting in the sense that it retains its shape, and has four segments, two of which, identified by reference numeral 16, have one design or set of designs, and two others of which, indicated by reference numeral 17, have different designs. The segments 16 and 17 are of a size to be contained behind and obscured by the front walls 20 of the members 9 and 10. The design carrier 15 is closely but rotatably mounted in the channels of the channel members 9 and 10, so that they can be rotated between positions at which the segments 16 are displayed and segments 17 concealed, and a position at which segments 17 are displayed and segments 16 are concealed. A click detent or other locating device can be provided to make the positioning of the segments easier and to hold them in the desired position. In assembling the eyeglasses of this embodiment, the design carrier 19 is made thin and flexible enough to permit its being flexed sufficiently to snap into the appropriate channels.

Referring now to FIGS. 4 and 5 for a second embodiment, an eyeglass 41 has a lens frame 42 connected by a nose piece or bridge 47. The lens frame 42 can be of any shape, as long as it is symmetrical about a horizontal line, as viewed in FIGS. 4 and 5, passing midway of their height. In the embodiment shown in FIGS. 4 and 5, the frames are oval, with a long axis through the center line of the frame. The eyeglasses 41 have temple pieces 43, which can be conventional or can be made as described in applicant's application Ser. No. 08/651,271, as can the temple pieces of any of the other embodiments. The temple pieces 43 are hinged to the frame by a hinge 44, which can be either conventional or, if the temple pieces are made as described in application Ser. No. 08/651,271, in the manner in which the hinges of that application are described as being made.

In this embodiment, a design carrier 50 shaped complementarily to the halves of the frame, as shown in FIGS. 4 and 5, has a first surface 51 which is exposed (in the position shown in FIG. 4), and a second surface 52, which may bear the same design or a different design and which is exposed in the position shown in FIG. 5. Ends 55 of the arcuate design carrier 50 are hinged to the frame 42, to rotate between a position at which the surface 52 is displayed, in the "down" position as shown in FIG. 5, and the "up" position in which the surface 51 is displayed, as shown in FIG. 4.

It can be seen that if the frames are symmetrical about a vertical line, the decorative elements can be mounted to rotate about a vertical axis. It can also be seen that if the decorative element is opaque, the two outer surfaces of the frame can be differently decorated, as by different color, graphic representation or writing. If the decorative element is transparent or translucent and colored, the outer surface of the frame can be colored appropriately to produce an unusual effect. If the decorative element is colored blue, and the frame's lower half is yellow, the appearance will be green and different from that in which the frame surface is either white or colorless or black. Similarly, if the upper part of the frame is made a different color, such as red, the blue of the transparent decorative element will produce a purple appearance.

Referring now to FIGS. 6 through 11 for a third embodiment, reference numeral 61 indicates an eyeglass with a lens frame 62, temple pieces 63 and a hinge 64, which like the hinges in the other two embodiments can be conventional or made in accordance with applicant's application to which reference has been made. In this embodiment, a nose piece 67 has upwardly extending arms 68, and downwardly extending legs 69, each of which ends in an outwardly facing, plane surface 70, the two surfaces 70 being parallel to one another. Threaded blind passages 72 extend through and perpendicularly to the surfaces 70. Outer frame members 74 have arms 75 and legs 76 corresponding to the arms 68 and legs 69 of the nose piece 67 with flat, parallel surfaces 79 corresponding to, parallel with and facing the surfaces 70 of the arms 68 and legs 69. The arm 75 has a countersunk passage 77 extending perpendicularly to the face 79 with a relatively small bore extending through the outer surface of the arm and a relative large bore 98 extending from the face 79 far enough to form a spring seat, as shown in FIG. 8D.

Connecting shafts 80, in the illustrative embodiment, have a slotted head 82 that is received in the countersunk end of the passage 77, a shank 83 that extends through the passage, and a threaded end 84 that is threaded into the passage 72 in the arm 68 and the leg 69. In this embodiment, a stiff tube 85 surrounds the shaft 83, and extends between and abuts against parallel surfaces of the faces 70 and 79. The tube 85 serves as a spacer and provides a rigid structural member between the nose piece and the outer frame member when the shaft 80 is pulled up tightly.

In the embodiment shown in FIG. 7, a decorative element 89, square in transverse cross section, is rotatably mounted on the tube 85. The element 89 is elongatedly rectangular with four sides 92, and a central passage 90 extending lengthwise completely though it. In this embodiment, an end contiguous the faces 79 is counterbored to form an element spring seat 81. A spring 86, seated in the seats 98 and 81 is mounted around the tube 85, and bears against shoulders in the seats 98 and 81 to bias the element 89 toward the nose piece arms and legs. The surfaces 70 of the arms 68 and legs 69 are recessed, as indicated at 100, complementarily to projections 99 at the end of the elements 86 removed from the end contiguous the face 79. The seating of the projections in the recesses holds the element in the desired position. To rotate the element to a different position, the element is pulled against the bias of the spring 86 until the projection 99 clears the rim of the recess 100 in the face 70, and rotated to the desired position, when it is released to permit the projection to seat in the recess. In the embodiment shown in FIG. 8A, each of the recess and the projection is square. Each of the faces 92 of the carrier 89 has a different design, either a different color or different material or a different graphic representation, or writing of some sort. The lens 65 is spaced from the design carrier 89 sufficiently to permit the carrier to be turned as shown in FIGS. 6 and 7.

In FIG. 8B, a design carrier 96 is shown as being triangular in end view, with three sides 97 and a triangular projection that is received in a complementary triangular recess.

In FIG. 8C, a relatively narrow, rectangular decorative element 101 is shown. The element 101 has only two broad sides 102, which can be decorated in any suitable way. The carrier has a rectangular projection 99 and the face 70, a rectangular recess 100, complementarily configured and proportioned to receive the projection. Although this form of carrier offers only two changes of design, it is more compatible with the usual frame design than the square, triangular or otherwise polygonally shaped decorative elements.

A short, resilient tube 87 can be substituted for the spring 86.

Figure 13:
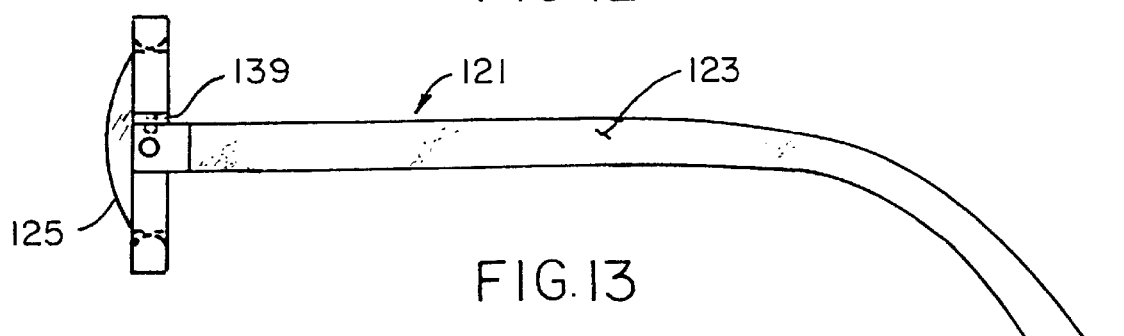
FIG. 13 is a view in side elevation of FIG. 12.
Figure 14:
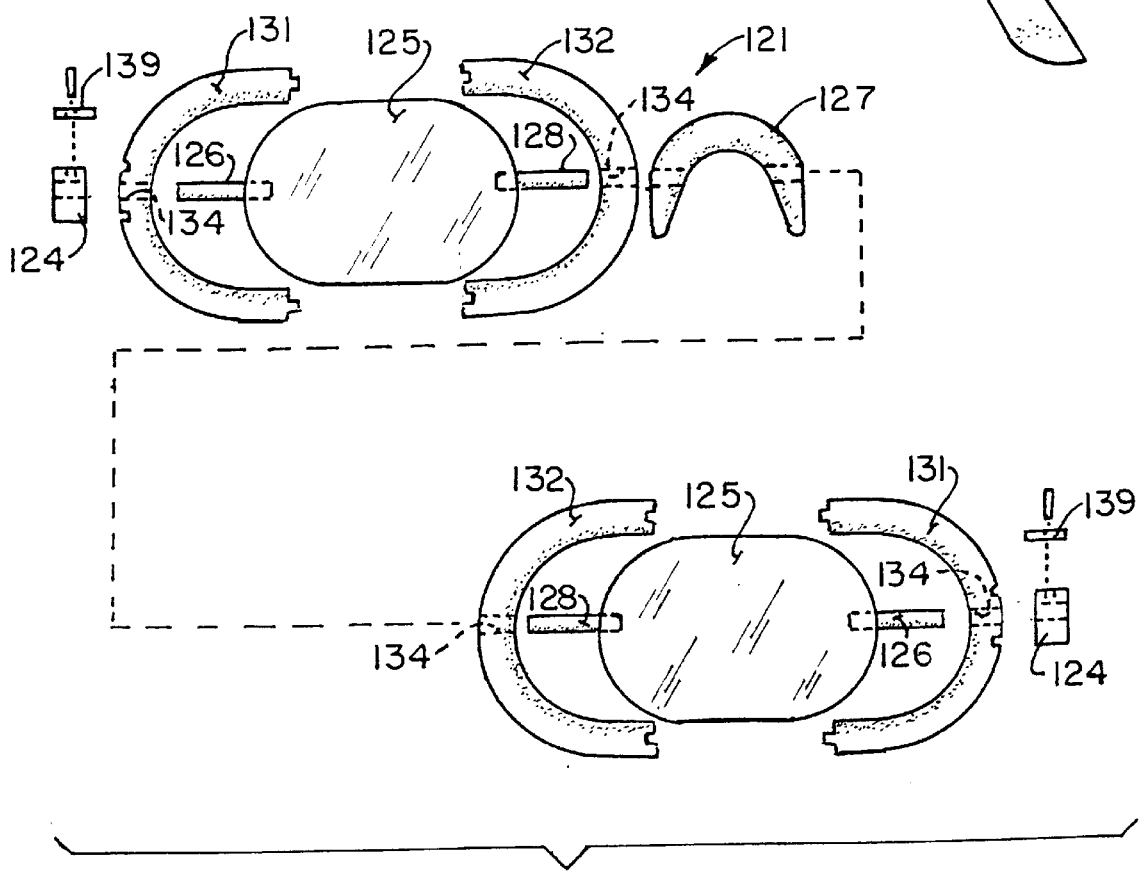
FIG. 14 is an exploded view illustrating somewhat schematically the assembly of this embodiment.

Referring now to FIGS. 12 through 14 for yet another embodiment of this invention, reference 121 indicates a pair of "rimless" eyeglasses, with temple pieces 123, lens 125 and a nose piece 127. Each of the temple pieces has a hinge block 124. A hinge block pin 126 is anchored at an outboard end in the hinge block pin, and at its inner end, in the lens 125. A nose piece pin 128 is anchored in its outboard end in the nose piece 127, and at its inboard end in the lens 125.

A frame 129 is rotatably mounted on the pins 126 and 128, as shown in FIGS. 12 and 14. The frame 129 is spaced sufficiently from the lens 125 to permit it to rotate through 180°. In this illustrative embodiment, the frame 129 is shown as being made up of parts 131 and 132 with aligned pin-receiving passages 134 along a center line, and, at free ends, a mortise and tenon joint, which may be glued, to provide a strong joint.

In this embodiment, the frame members 131 are shown as having notches 137 on opposite sides of the passage 134, to receive a detent 139, shown somewhat schematically.

In assembling the frame of this embodiment, the pins 126 and 128 are anchored to the lens 125 in ways conventional for "rimless" eye glasses, the pieces 131 and 132 are assembled on the pins 126 and 128 and joined at their mortise and tenon ends. The pins 126 and 128 will project beyond the frame sections to be anchored in the hinge block 124 and the nose piece 127. The detent 139 is then put in place in the hinge block. The temple pieces 123 are hinged into the hinge block 124 in ways described in applicant's Application Ser. No. 651,271, and the assembly is complete. It can be seen that the frame 129 can be made in one piece and the pins 126 and 128 anchored in or to the lens 125 after they have been passed through the passages 134. The detent 139 can take various forms, such as a spring loaded ball or even a resilient bump on the hinge block or the notch can be provided in the hinge block and the bump on the frame member.

The frame of the embodiment shown in FIGS. 12 through 14 has different indicia on the two broad faces of the frame, so that only two different indicia will be exposed by rotating the frame 129.

Numerous variations in the construction of devices of this invention within the scope of the appended claims will occur to those skilled in the art in the light of the foregoing disclosure. Merely by way of illustration, as applied to clocks, picture frames, mirrors or watches, for example, the frame may take the form of a bezel or rim or other mounting means, as long as it is adapted to serve as a mount for a rotatable design carrier, as explained above. One or both of the frame and decorative carrier elements can be metallic. In the embodiment of FIGS. 6–11, a solid bridging element, integral with the nose piece and outer channel member, can be substituted for one of the decorative elements on one or both sides of the nose piece. The decorative element channels of the first embodiment can be elongated even to the point of meeting, and provided with a cut out part to permit manual manipulation of the decorative element. If the channel/frame member is continuous, it can be made in two parts, the decorative element inserted, and the parts secured to one another to complete a channel. Alternatively, the channel can have a slot in it of such size as to admit a flexible ring split radially to permit it to be inserted into the channel, where it will remain, to be manipulated in the same way as if it were uninterrupted. In any such an arrangement in which the segments of the channel extend through more than ninety degrees, the outer wall of the channel should be transparent or translucent, and either colored, or radially blocked or striped, and the decorative element should be segmentally varicolored or ornamented in such a way that a different decorative aspect is displayed as it is rotated. In the embodiment in which the design element is hinged to a frame, the design element can be used with a half glass or "granny" glasses, the decorative element being shaped complementarily to the lens-holding part of the frame, and hinging upwardly to give the illusion of a full glass. The "frameless" embodiment can also have a frame or bezel or rim radially inboard of the orbiting decorative element, the pins or shafts projecting outwardly from and being secured to the frame, bezel or rim. The "decorative element" can also have a utilitarian aspect. For example, where goggles are used on successive shifts, the names of the wearers can be written on the decorative element, and changed so that the name of the wearer during a particular shift is exposed. These are merely illustrative.

As various changes could be made in the above constructions without departing from the scope of the invention, it is intended that all matter contained in the above description or shown in the accompanying drawings shall be interpreted as illustrative and not in a limiting sense.

I claim:

1. In a device with a central transparent member and a frame around said member the improvement comprising fixed means for holding said transparent member stationary with respect to said frame, and decorative means rotatable mounted on said frame for rotation with respect to said fixed means from a position at which one decorative aspect of said decorative means is displayed to a position at which another, different decorative aspect of said decorative means is displayed.

2. Eyeglasses having a fixed frame, and decorative means comprising a half-frame edge-covering piece hinged to said frame for rotation between a position at which about one half of said frame is covered and a position at which another half of said frame is covered.

3. Eyeglasses having a frame made up of a nose-engaging piece, and a temple piece; a lens fixedly mounted between said nose-engaging piece and said temple piece, at least one bridging shaft secured to and extending between said nose-engaging piece and said temple piece, and decorative means comprising at least one segment rotatably mounted on said bridging shaft and spaced from said lens far enough to permit rotation of said decorative segment selectively to display different indicia on said segment.

4. Eyeglasses having a nose-engaging piece and temple pieces, fixed means comprising annular channel members connected to said nose-engaging piece and temple pieces and a decorative member comprising a self supporting annulus mounted slidably in said channel members for rotation with respect thereto.

5. In eyeglasses having a nose piece and temple pieces, and lenses between said nose piece and said temple pieces and fixed in relation to said nose piece and said temple pieces, the improvement comprising two nose piece pivot pins extending between opposite sides of said nose piece and said lenses and anchored to said nose piece at one end of each said nose piece pivot pin and anchored at another end of said nose piece pivot pin to said lens, and temple piece pivot pins each anchored at one end to one temple piece and at another end to one of said lenses, said pivot pins having a reach between said nose piece and said lenses and between said temple pieces and said lenses, and decorative elements mounted on said reach of said pivot pins to rotate about said pivot pins, said decorative elements extending around the peripheries of said lenses and sufficiently clear of said lenses to permit said decorative elements to be rotated about said pivot pins.

6. The device of claim 5 including means for selectively releasably restraining said decorative elements from rotating.

7. In eyeglasses having a nose piece and temple pieces, and lenses between said nose piece and said temple pieces and fixed in relation to said nose piece and said temple pieces, the improvement comprising a decorative element mounted on and between said nose piece and a temple piece for rotation with respect to at least one of said lenses from a position at which one decorative aspect of said decorative element is displayed to a position at which another, different decorative aspect of said decorative element is displayed.

8. The improvement of claim 7 including fixed frame means extending between said nose piece and said temple pieces.

9. The improvement of claim 8 wherein said decorative element comprises a half frame edge covering piece hinged to said frame for rotation between a position at which one half of said frame is covered and a position at which another half of said frame is covered.

10. The improvement of claim 9 wherein said decorative element is hinged on a horizontal axis.

11. The improvement of claim 9 wherein said decorative element is hinged on a vertical axis.

12. The improvement of claim 8 wherein said fixed means comprises a part of said nose-engaging piece, a temple piece and at least one bridging shaft between said nose-engaging piece and said temple piece, and said decorative element comprises at least one segment rotatably mounted on said bridging shaft.

13. The improvement of claim 8, wherein the fixed means comprises annular channel members connected to said nose-engaging and temple pieces, and the decorative element comprises a self-supporting annulus mounted slidably in said channel members for rotation with respect thereto.

14. In a device with a transparent central member, the improvement comprising shaft means connected at one end to said central member, and decorative means mounted on said shaft means for rotation with respect to said central member from a position at which one decorative aspect of said decorative means is displayed to a position at which another, different decorative aspect of said decorative means is displayed, said decorative means being symmetrically pivoted with respect to said central member, and spaced from said central member sufficiently to permit said decorative means to rotate around said central member.

15. The improvement of claim 14 wherein said central member is mounted in a frame, and said shaft means is secured to said frame.

16. The improvement of claim 14 wherein said shaft means is a pair of aligned, oppositely projecting pins secured directly to said central member.

* * * * *